(12) United States Patent
Koivisto et al.

(10) Patent No.: US 9,154,194 B2
(45) Date of Patent: Oct. 6, 2015

(54) DEVICES AND METHODS RELATED TO IMPROVEMENTS IN COORDINATED MULTIPOINT TRANSMISSION ARRANGEMENTS

(75) Inventors: Tommi Koivisto, Espoo (FI); Helka-Liina Maattanen, Helsinki (FI); Mihai Enescu, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 843 days.

(21) Appl. No.: 13/291,680

(22) Filed: Nov. 8, 2011

(65) Prior Publication Data
US 2013/0114428 A1    May 9, 2013

(30) Foreign Application Priority Data
Nov. 7, 2011    (GB) .................................. 1119212.7

(51) Int. Cl.
*H04L 12/28*    (2006.01)
*H04B 7/02*    (2006.01)
*H04B 7/06*    (2006.01)
*H04J 1/16*    (2006.01)

(52) U.S. Cl.
CPC .............. *H04B 7/024* (2013.01); *H04B 7/0615* (2013.01); *H04B 7/0691* (2013.01)

(58) Field of Classification Search
USPC ......................................... 370/252, 329, 430
See application file for complete search history.

(56) References Cited

U.S. PATENT DOCUMENTS

| | | | |
|---|---|---|---|
| 2010/0202311 A1 | 8/2010 | Lunttila et al. | |
| 2012/0113851 A1* | 5/2012 | Schober et al. | 370/252 |
| 2012/0282964 A1* | 11/2012 | Xiao et al. | 455/515 |
| 2013/0223258 A1* | 8/2013 | Seo et al. | 370/252 |
| 2014/0233498 A1* | 8/2014 | Chen et al. | 370/329 |
| 2014/0247743 A1* | 9/2014 | Seo | 370/252 |
| 2014/0328277 A1* | 11/2014 | Xiao et al. | 370/329 |

OTHER PUBLICATIONS

EP Combined Search and Examination Report under Sections 17 and 18(3) issued for corresponding GB Patent Application No. GB 1119212.7, Feb. 21, 2012.
3GPP TR 36.819 v1 1.0.0, Sep. 2011, Coordinated multi-point operation for LTE physical layer aspects.

(Continued)

*Primary Examiner* — John Pezzlo
(74) *Attorney, Agent, or Firm* — Oblon, McClelland, Maier & Neustadt, L.L.P.

(57) ABSTRACT

For coordinated multipoint transmission arrangements there is provided a device, including a controller module, configured to control a plurality of transmission points, each constituted by a set of at least one transmit antenna, to transmit data to another device in a coordinated transmission from at least a subset of the plurality of transmission points, wherein each subset with resources allocated thereto defines a respective coordinated transmission scheme, wherein the controller module is configured to transmit information on resources pertaining to multiple coordinated transmission schemes, and send at least one biasing parameter associated to at least one of the transmission schemes, to be applied for biasing a channel quality parameter. Another device includes a controller module, configured to report feedback responsive to such coordinated transmission, and the controller module is, among others, configured to apply the at least one biasing parameter to derived channel quality parameters.

26 Claims, 2 Drawing Sheets

(56) References Cited

OTHER PUBLICATIONS

Huawei et al: 'Open issues for aperiodic and periodic CSI reporting' 3GPP Draft; R1-I10021 Open Issuses for Aperiodic and Periodic CSI Reporting Final, 3rd Generation Partnership Project (3GPP), vol. RAN WG1, No. Dublin, Ireland; Jan. 17, 2011, Jan. 11, 2011, XP050490004, [retrieved on Jan. 11, 2011] the whole document.

Samsung: 'CQI Reference Resource Timing for LTE-A', 3GPP Draft; R1-110089, 3rd Generation Partnership Project (3GPP), vol. RAN WG1, No. Dublin, Ireland; Jan. 17, 2011, Jan. 12, 2011; XP050490306 [retrieved on Jan. 12, 2011]; the whole document.

'3rd Generation Partnership Project;Technical Specification Group Radio Access Network; Evolved Universal Terrestrial Radio Access (E-UTRA); Physical layer procedures (Release 10)', 3GPP Standard; 3GPP TS 36.213, 3rd Generation Partnership Project (3GPP),vol. RAN WG1, No. V10.3.0, Sep. 25, 2011, pp. 1-122, XP050553950,[retrieved on Sep. 25, 2011] cited in the application Sections 7.2.1, 7.2.5 and 8.0.

* cited by examiner

US 9,154,194 B2

DEVICES AND METHODS RELATED TO IMPROVEMENTS IN COORDINATED MULTIPOINT TRANSMISSION ARRANGEMENTS

CROSS REFERENCE TO RELATED APPLICATION

This application claims benefit under 35 U.S.C. §119(a) and 37 CFR 1.55 to UK Patent Application 1119212.7, filed on Nov. 7, 2011.

FIELD OF THE INVENTION

The present invention relates to devices, methods and computer program products configured to achieve improvements in coordinated multipoint transmission arrangements, i.e. configured to be deployed in a scenario for mobile communication which scenario comprises a plurality of transmission points, each constituted by a set of at least one transmit antenna, for transmitting data to another device in a coordinated transmission from at least a subset of the plurality of transmission points.

BACKGROUND

Mobile data transmission and data services are constantly making progress. With the increasing penetration of such services, data throughput and transmission reliability find more and more attention.

Under one aspect, investigation is made in scenarios for mobile communication which comprise a plurality of transmission points, each constituted by a set of at least one transmit antenna, for transmitting data to another device in a coordinated transmission from at least a subset of the plurality of transmission points.

It should be noted that concepts outlined in connection with the present invention are generally independent of any particular communication standard; rather, they are generally applicable to a variety of compatible standards. In order to properly describe the concept(s), however, for explanatory purposes only and without any intention to limit the applicability of the concept(s) introduced in the specification to a particular standard, those concept(s) are described with reference to an example scenario. As the example scenario, LTE (Long Term Evolution) and/or LTE-A (LTE-Advanced) was chosen for the network infrastructure.

That is, e.g. in the 3rd Generation Partnership Project (3GPP) Long Term Evolution (LTE) and LTE-Advanced (LTE-A), single cell single-user (SU-) and multi-user (MU-) multiple-input multiple-output (MIMO) network performance is interference-limited, especially at the cell edge.

Therefore, introduction of the coordinated multipoint (CoMP) transmission/reception technology has been considered, where in downlink (from a network device such as an eNB (evolved NodeB) towards a terminal such as a user equipment UE), multiple points cooperate in scheduling and transmission in order to strengthen the desired signal and to mitigate inter-cell interference.

According to e.g. the 3GPP technical report (TR) on CoMP, TR36.819, a point is defined as a set of geographically co-located transmit antennas and the sectors of the same site correspond to different points. It should be noted that a cell is formed by one or multiple points.

The above mentioned CoMP TR was approved after a recent RAN meeting. The agreed CoMP working item definition proposes the following focus for the CoMP work during a subsequent release (e.g. Rel-11):

"The work for specifying CoMP support in Rel-11 should focus on
  Joint transmission (JT)
  Dynamic point selection (DPS), including dynamic point blanking
  Coordinated scheduling/beamforming (CS/CB), including dynamic point blanking".

In joint transmission (JT) CoMP, two or more points transmit simultaneously to a CoMP user. Dynamic point selection (DPS) on the other hand refers to a scheme where the transmission point is switched according to changes in signal strength. In coordinated beamforming/scheduling (CB/CS), in turn, the scheduling decisions of neighbor points are coordinated in order to reduce interference. In principle, all schemes may include blanking/muting which means that one or more transmission points are blanked/muted (switched off or not used for transmission) to decrease the interference.

The agreed CoMP working item targets specification of intra-cell and inter-cell DL CoMP schemes which operate in homogeneous and heterogeneous configurations. Four main scenarios have been studied so far: intra-site (scenario 1), inter-site with high power remote radio head (RRH) (scenario 2), low power RRH within the coverage of the macro cell, without and with the same cell ID (scenarios 3 and 4, respectively).

CoMP working item addresses both frequency division duplex FDD and time division duplex TDD. Hence, unified solutions should be targeted, as it is always the case in LTE specifications.

CoMP is intended to improve the performance of cell edge users, as especially at cell edge the performance is interference limited. A CoMP measurement set is formed by M cells/points for which the UE is measuring channel state information. The reporting set has been limited to N cells/points defining the number of points for which CSI feedback is reported. A common assumption has been that the CoMP reporting set is formed by two to three points. Also the CoMP reporting set could be equivalent to the CoMP measurement set. The number of points involved in CoMP scheme (cooperation set) does not need to be signaled to the UE or mentioned in specifications but is left for network implementation. The point from which the UE would receive transmission in single-cell mode is defined as the serving point.

In Release 10, different reference signals (RS) were defined for CSI estimation and data demodulation purposes. Namely, channel state information reference symbols (CSI-RS) and demodulation reference symbols (DM-RS).

Such reference symbols are assigned to (specific) physical resource elements RE within physical resource blocks PRB. A resource element RE is represented by a time slot and a frequency (bandwidth) assigned to it within the frequency-time domain. A plurality (defined number) of resource elements in frequency/bandwidth domain form a physical resource block PRB (in frequency domain), and a plurality of PRBs are present within a channel.

PDSCH (Physical downlink shared channel) resource element muting is also specified, allowing for multi-cell channel estimation. The baseline feedback has been agreed to be implicit feedback which consists of rank indicator (RI), precoding matrix index (PMI) and a channel quality indicator (CQI). Hence, the UE estimates the channel, selects rank and PMI and calculates the post-processing (after receiver) SINR (signal to interference noise ratio) and derives the CQI based on that. CQI may be seen as indicative of the post processing SINR. Release 10 feedback operates per point. The CoMP specific flavors are that a UE may receive CSI-RS resources from more than one point and it is possible to design aggregated (over multiple CSI-RS resources) or per point (per CSI-RS resource) feedback. The per-point PMIs may be improved by a combiner feedback that may be an inter-point phase and/or amplitude value.

Table 1 summarizes the feedback and channel estimation options for each CoMP scheme.

TABLE 1

Feedback for different CoMP schemes

|  | JT | DPS + muting | CS/CB + muting |
|---|---|---|---|
| Feedback | 1) Per point PMI/CQI (+ combiner) 2) Per point PMI (+combiner) + aggregated CQI + serving point CQI 3) Aggregated PMI/CQI + serving point PMI/CQI | Per point PMI/CQI + point selection + possible muting indication | Per point PMI/CQI or CS/CB + muting specific additional feedback |
| Channel estimation | Per point CSI-RS or aggregated single CSI-RS pattern | Per point CSI-RS | Serving point CSI-RS + possibly other point CSI-RS |

During a recent RAN meeting, the following working assumption was agreed:

"Definition: "CSI-RS resource" here refers to a combination of "resourceConfig" and "subframeConfig" which are configured by higher layers.

Standardize a common feedback/signaling framework suitable for scenarios 1-4 that can support CoMP JT, DPS and CS/CB. Feedback scheme to be composed from one or more of the following, including at least one of the first 3 sub-bullets:

feedback aggregated across multiple CSI-RS resources
per-CSI-RS-resource feedback with inter-CSI-RS-resource feedback
per-CSI-RS-resource feedback
per cell Rel-8 CRS-based feedback Note that use of SRS sounding reference signal (SRS) used in uplink measurement may be taken into account when reaching further agreements on the above."

The CoMP problem relates mostly to the CQI feedback. The CQI is used by the eNB to perform adaptive modulation and coding which means the transmission rate is adapted based on channel conditions. Accuracy of the CQI value affects greatly on the system performance, especially if the CQI is overestimated and too high transmission rate is assigned which is not supported by the actual radio link. The CQI depends on the transmission hypotheses made by UE at a given time. For example:

When reporting an aggregated JT CQI, UE assumes combined transmission from N points to the UE, When reporting a DPS CQI without muting, UE assumes transmission from a selected transmission point and interference from other transmission points, When reporting a DPS CQI with muting, UE assumes transmission from one point and zero interference from points that are assumed to be muted, When reporting CQI for CS/CB, UE assumes transmission from one point and reduced interference or muting from other transmission points.

In addition to the transmission hypothesis, the CQI value depends on the hypothesis of the interference.

Generally, current activities in CoMP related research target to designing common feedback for the CoMP schemes.

In current TR 36.819, which was agreed after a recent RAN1 meeting, a baseline feedback is individual per-point feedback with or without complementary inter-point feedback. Several contributions indicate the need of unified feedback, though several contributions did not present any possible solutions but only stated a viewpoint in terms of a need of a unified solution.

Further, a hierarchical feedback structure to support CS/CB, DPS and JT CoMP was presented. In this regard, proposed is a fallback feedback for serving cell and additionally RI/PMI/CQI to other points, and if JT is configured, also inter-point phase and/or amplitude. The PMI reports to other points support CS/CB as such, and the per point CQIs are assumed to support also the possible JT transmission using eNB implementation-based CQI adaptation mechanisms. However, thus no aggregated CQI for JT is discussed. Muting assumptions for the CQIs were not discussed and additional feedback to support dynamic muting (blanking) was left for further study (FFS).

Another contribution proposes, for JT, a per CSI-RS resource feedback and aggregated CQI corresponding to JT hypothesis. For DPS, per point (CSI-RS resource) CQI is proposed based on which network decides the transmission point. Additionally, CQIs for different muting options may or may not be required as the CQI for muting can also be approximated by the eNB. For CS/CB the other resource PMI feedback is the required support. It is concluded that the per resource CSI-RS feedback with possible enhanced interference estimates supports a seamless mixture of all the CoMP categories.

However, a concrete CQI feedback design is not presented in that contribution. Either the UE reports both, aggregated CQI for JT and per resource CQIs for DPS, or the CQI reporting mode is configured by the network.

In another contribution, studies are made on different assumptions for CQI calculations for per point CQI reporting with the assumption that from N per point CQIs the eNB derives the CoMP CQI.

Still further, there is a proposal to have per point CQI/PMI feedback with possible combiner feedback to support both, DPS and JT CoMP. The muting option in the CQI calculations remained unconsidered.

An analysis on the performance of JT CoMP with different feedback assumptions was presented in another contribution. The conclusions from that simulations is that non-coherent JT with aggregated CQI can achieve similar performance as coherent JT (with aggregated CQI). Thus, in that scenario, the per point CQIs and the aggregated CQI may not have the same value for JT CoMP performance.

Further contributions are related to CoMP CQI. Several thereof did not discuss the CQI derivation details. Others presented equations on how the eNB can derive the CQI for joint transmission from per point CQIs with a given assumption on interference. The assumptions on how the UE would estimate the interference level for the per-point CQIs was not considered.

Still other contributions discuss measurement objectives as follows "Observation 1: for each CoMP scheme, considering the coordination method, the interference should: Include signals from all the points/cells outside of the transmission set or coordination set; consider the actual resource elements causing interference to the PDSCH; not include signals from the point/cell the UE assumes as transmitting the PDSCH; not include signals from the point/cell with blanking on some or all resource elements"; but no concrete scheme for measurement is shown.

For example in the case of CS/CB, coordination between points reduces the level of interference, though the level of interference reduction is typically not known by the UE.

For describing the problem this invention relates to, the following shall be considered.

The terminal device UE is able to measure the interference and evaluate the channel quality indicators (CQIs) for different CoMP schemes (hence under respective different CoMP hypothesis) and to subsequently pick (or determine for selection and reporting towards the network device eBB) the best CoMP scheme for the UE. ("Best" in the sense that the selected CoMP scheme optimizes the UE's communication "experience" e.g. in terms of highest data rate/throughput, lowest interference or the like).

However, from UE perspective, certain CoMP schemes, e.g. joint transmission, might always be better than the other available schemes. On the other hand, from the perspective of the whole system (represented by the eNB for example) it might be more beneficial to utilize e.g. dynamic point selection or CS/CB (rather than joint transmission (JT) preferred by the UE).

Hence, the system performance might not be fully optimized. Several options for CQI computation and reporting are possible that may avoid such situation:

1) Use of Multiple CQI Values in Reporting:

One would report $CQI_{JT}$ and (one or more) $CQI_{non-JT}$, covering multiple CQI hypothesis. Hence, in this case, the UE would report CQIs for multiple schemes, but let the eNB decide which to use. $CQ_{non-JT}$ may be computed also as a delta CQI compared to $CQI_{JT}$. However, from feedback perspective, multiple CQIs (or differences delta between the multitude of CQI values) need to be transmitted. This implies an increased overhead on the feedback (uplink control) channels.

2) Use of a RRC Configured CQI Type

In this case, the eNB would indicate the specific (single) hypothesis for which the CQI needs to be computed. As to computation complexity, the complexity involved is the one resulting for only one hypothesis CQI calculation, and also from the feedback perspective, only one CQI would have to be transmitted. However, flexibility to utilize different schemes and to use those more dynamically based on current interference situations the UE sees, is then lost.

Thus, existing and/or discussed systems for CoMP still leave it unaddressed to control the selection of the CoMP transmission scheme applied at a given time (for transmission from an eNB towards a UE).

Thus, there is still a need to further improve such systems.

SUMMARY

Various aspects of examples of the invention are set out in the claims.

According to a first aspect of the present invention, there is provided a device, comprising a controller module, configured to control a plurality of transmission points, each constituted by a set of at least one transmit antenna, to transmit data to another device in a coordinated transmission from at least a subset of the plurality of transmission points, wherein each subset with resources allocated thereto defines a respective coordinated transmission scheme, wherein the controller module is configured to transmit information on resources pertaining to multiple coordinated transmission schemes, and send at least one biasing parameter associated to at least one of the transmission schemes, to be applied for biasing a channel quality parameter, and a method, comprising controlling a plurality of transmission points, each constituted by a set of at least one transmit antenna, to transmit data to another device in a coordinated transmission from at least a subset of the plurality of transmission points, wherein each subset with resources allocated thereto defines a respective coordinated transmission scheme, transmitting information on resources pertaining to multiple coordinated transmission schemes, and sending at least one biasing parameter associated to at least one of the transmission schemes, to be applied for biasing a channel quality parameter.

According to a second aspect of the present invention, there is provided a device, comprising a controller module, configured to report feedback to another device responsive to the another device's coordinated transmission from at least a subset of a plurality of transmission points, each transmission point being constituted by a set of at least one transmit antenna, wherein each subset with resources allocated thereto defines a respective coordinated transmission scheme, wherein the controller module is configured to receive information on resources pertaining to multiple coordinated transmission schemes, receive at least one biasing parameter associated to at least one of the transmission schemes, to be applied for biasing a channel quality parameter, derive a channel quality parameter for each of the multiple coordinated transmission schemes, and apply the at least one biasing parameter to the derived channel quality parameters, and a method, comprising reporting feedback to another device responsive to the another device's coordinated transmission from at least a subset of a plurality of transmission points, each transmission point being constituted by a set of at least one transmit antenna, wherein each subset with resources allocated thereto defines a respective coordinated transmission scheme, receiving information on resources pertaining to multiple coordinated transmission schemes, receiving at least one biasing parameter associated to at least one of the transmission schemes, to be applied for biasing a channel quality parameter, deriving a channel quality parameter for each of the multiple coordinated transmission schemes, and applying the at least one biasing parameter to the derived channel quality parameters.

Advantageous further developments are set out in respective dependent claims.

According to a third aspect of the present invention, there are provided computer program products comprising respective computer-executable components which, when the program is run on a computer, are configured to perform the above method aspects, respectively.

The above computer program product may further comprise computer-executable components which, when the program is run on a computer, perform the method aspects mentioned above in connection with the method aspects.

The above computer program product/products may be embodied as a computer-readable storage medium.

The methods, devices and computer program products described in this document use, at least in exemplary embodiments, one or more biasing parameters associated to at least one of the transmission schemes, to be applied for biasing a channel quality parameter.

Accordingly, under at least aspects of this invention, improvements in CoMP arrangements are achieved. In particular, according to at least exemplary aspects, performance improvement in CoMP scenarios is based on such methods, devices and computer program products which enable appropriate CQI feedback to be provided, and which contribute to an improved CQI reporting for CoMP. At least some aspects involved provide for a simple implementation of the improvements. Thus, according to at least individual aspects, the UE is no longer alone deciding on the best scheme or CQI value to be reported. Rather, the eNB influences or biases the decision taken by the UE in terms of which CQI value is to be reported. By virtue thereof, the system (eNB) gains control over the CoMP scenario to be selected based on the reported/selected CQI value and by biasing the selection. That is, the eNB, according to an aspect of the invention, biases the selection of CQI values at the UE side. This, in turn, also enables better optimization of the system performance from a system perspective and moves away from a UE centric performance optimization.

Thus, according to aspects of the invention, it is allowed for the eNB to have some control over which schemes are reported by the UE to the eNB as the "best" CoMP schemes. With the proposed approach, the eNB may aim at optimizing full system throughput rather than throughput to some individual UEs.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the invention will be described herein below.

Figure 1:
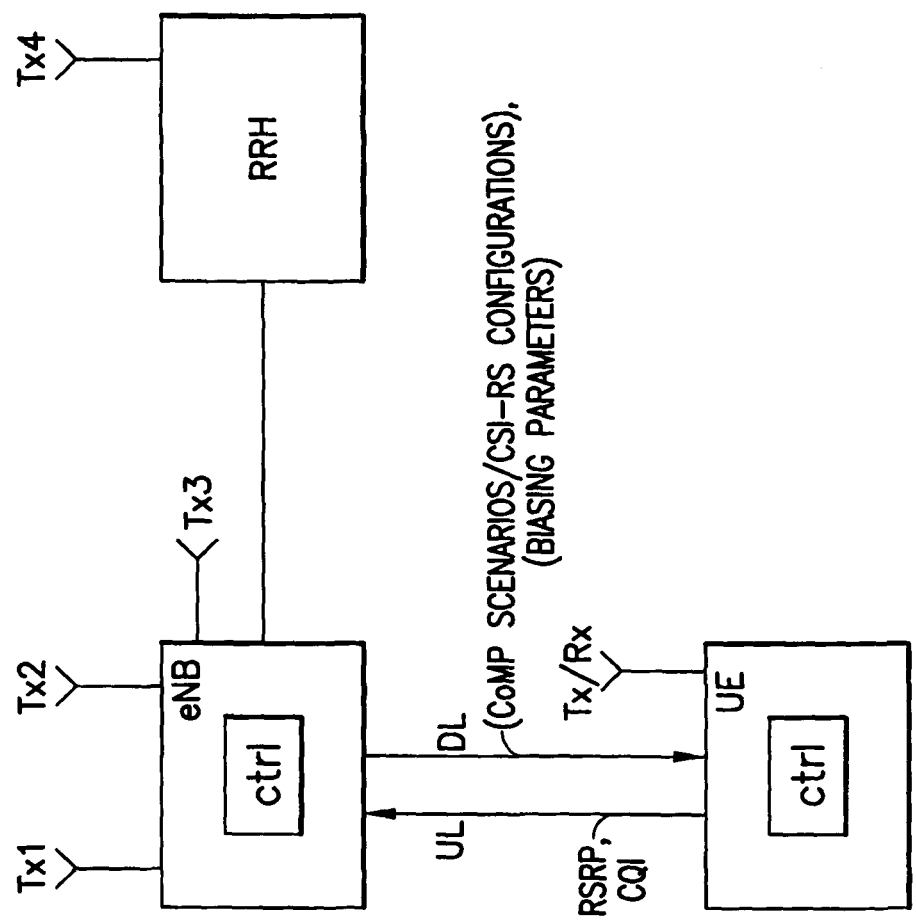
FIG. 1 illustrates an overview of devices/entities involved.

Generally, the invention is implemented in a framework for a coordinated transmission from multiple points or antennas, as illustrated in rough outline in FIG. 1.

For the subsequent description and explanation of aspects and concepts of the present invention, the following definitions/explanations shall support understanding:

In coordinated multipoint transmission CoMP, a CoMP scheme basically represents a set of transmission points used, i.e. "which" ones are used as well as "how" those are used (i.e. jointly used in joint transmission "JT", or non-jointly used e.g. in DPS or CS/CB transmission, referred to as "non-JT"). Plural co-located antennas may constitute a transmission point, while a transmission point may, in some scenarios also be represented by a single antenna only. Transmission from a transmission point is effected within (physical) resources such as resource elements RE of (one or more) physical resource blocks PRB. Signals (transmitted from the eNB and received at the UE) used for measurement/evaluation of the CoMP scenario are referred to as reference (signals or) symbols RS. Such reference symbols are assigned to (specific) physical resource elements RE within physical resource blocks PRB. A resource element RE is represented by a time slot and a frequency (bandwidth) assigned to it within the frequency-time domain. A plurality (defined number) of resource elements in frequency/bandwidth domain form a physical resource block PRB (in frequency domain), and a plurality of PRBs are present within a channel. Thus, a plurality of such reference symbols RS used for obtaining information on channel state(s) are referred to as CSI-RS. A plurality of REs (time slots) in time domain form so-called sub-frames or frames, respectively.

A set of those resources carrying CSI-RS signals may thus be representative for an underlying CoMP (transmission) scheme. When computing a parameter indicative of a quality of the underlying channel such as a channel quality indicator (CQI), a terminal UE assumes transmission from the respective set of CSI-RS resources (on which it bases its measurement and computation) according to the CoMP scheme assumption.

Note that the parameter CQI is used herein as an exemplary example only and that other parameters may likewise be applicable in the framework of at least aspects of the present invention when applied to other standards in which identical, similar or corresponding parameters may be assigned a different name.

In case a transmission point TP_i is represented by a single antenna Tx_i, a single respective CSI-RS_i may be assigned thereto, and an evaluated channel will be representative for a channel established from that TP_i (e.g. at an eNB or a remote radio head RRH under control of the eNB) towards the terminal.

On the other hand, in case a transmission point TP_i is represented by plural antennas Tx_i & Tx_k, still a single respective CSI-RS_j may be assigned thereto, and an evaluated channel will be representative for a channel established from both Tx_i & Tx_k (e.g. at an eNB or a remote radio head RRH under control of the eNB) towards the terminal.

Still further, a scenario is possible in which a transmission point TP_i is represented by one or more antennas Tx_i, but plural CSI-RS_n,m may be assigned thereto. An evaluated channel will then be representative for a channel established from TP_i (e.g. at an eNB or a remote radio head RRH under control of the eNB) but using resources CSR-RS_n,m towards the terminal.

FIG. 1 illustrates an overview of devices/entities involved with reference to entities known from LTE/LTE-A. Other names may be assigned to similar entities in other standards, while as long as the functionality imparted thereto remains the same or substantially similar, the present invention as described herein below will remain applicable also to those other standards.

As shown in FIG. 1, a network device such as a transceiver device eNB is equipped with a control module ctrl as well as with at least one transmit antenna Tx1, Tx2, Tx3. Note that the transmit antennas may also be used for reception Rx, or a separate reception antenna (not shown) can be provided to receive uplink transmissions (from a terminal UE to the eNB). However, for description purposes of the CoMP scenarios, focus is laid to the transit antennas Tx. The eNB is connected to and controls a (single or plural) remote radio head RRH also equipped with a transmit antenna Tx4. The eNB and potentially the RRH are in communication with a terminal such as a user equipment UE equipped with a transmit/receive antenna Tx/Rx as well as with a control module ctrl.

The eNB transmits data in downlink DL to the UE in a coordinated multipoint transmission CoMP mode. The CoMP mode may comprise plural CoMP scenarios, or CoMP configurations, respectively, represented by respective CSI-RS resource configurations (non-zero or also zero CSI-RS configurations, or optionally further RS configurations (CSI-RS or other RS) for estimation and/or interference measurement). DL transmission comprises data and control channels (such as the PDSCH or PDCCH). Control channels carry control signals and/or configuration signals for control/configuration of the UE. Under at least aspects of the present invention, those control and/or configuration data sent from the eNB to the UE comprise at least a threshold value and/or (one or more) weighting parameter(s) for being applied to a channel quality indicator CQI. Those threshold value and weighting parameters are also referred to herein below as biasing parameters. If both kinds of biasing parameters are sent to the UE, a further control data or trigger can be provided to control selection of one of the kinds, i.e. the threshold type bias or the weighting type bias. The trigger can be specific for CoMP scenarios, and/or depend on the CQI value, and/or be changed based on time, and/or be terminal specific, or the like.

The UE transmits data in uplink UL to the eNB using data and control channels. Control channels in UL, at least in relation to some aspects of the present invention, serve for carrying feedback signals from the UE to the eNB. The UE is configured to measure transmission channels in (assumed) respective CoMP scenarios (represented by respective CSI-RS configurations) and to compute a parameter indicative of a quality of the underlying channel such as a channel quality indicator CQI. At least such CQI parameter (determined at the UE and selected at the UE from plural determined ones) is fed back from the UE to the eNB. Furthermore, the UE may signal a report relating to a reference signal received power, RSRP, to the eNB.

Figure 2:
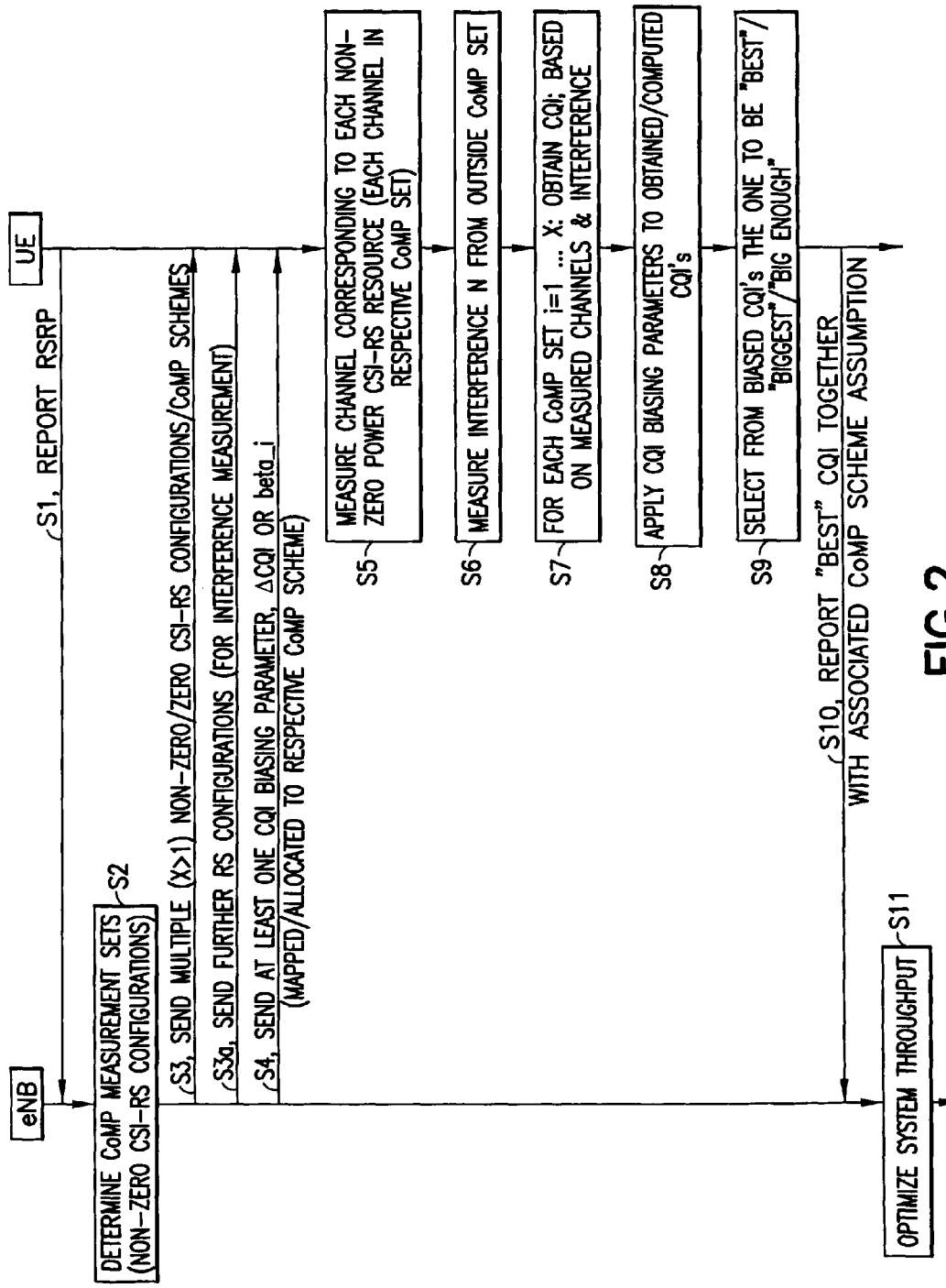
FIG. 2 illustrates a signaling diagram of a signaling between a network device such as an evolved NodeB (eNB) and a terminal device such as a UE, as well as a respective processing performed at the eNB and UE.

FIG. 2 illustrates a signaling diagram of a signaling between a network device such as an evolved NodeB, eNB, and a terminal device such as a UE, as well as a respective processing performed at the eNB and UE. Signaling between the entities eNB and UE is illustrated in horizontal direction in the drawing, while a respective processing performed at the entity is illustrated in vertical direction.

In a step S1, the UE sends a RSRP report to the eNB. The eNB in a step S2 may use such report to determine (or select) the CoMP measurement sets (i.e. (non-zero power) CSI-RS configurations) to be informed to the UE. (Each CSI-RS configuration thus corresponds to a CoMP transmission scheme that the UE shall assume for its CQI computation.) In a step S3, the eNB sends those plural (at least two) (non-zero power or zero power) CSI-RS configurations (at least two CoMP schemes to be assumed) to the UE. Optionally, in a step S3a (that may also be combined with S3) the eNB may send (at least one) further RS configuration (zero-power or non-zero power CSI-RS or other RS) to the UE which is useable for interference measurement and/or estimation.

In addition, in a step S4 (that may also be combined with S3, S3a) the UE sends at least one biasing parameter mapped to a respective CoMP scheme (CSI-RS configuration) to the UE. Such biasing parameter may be a difference "delta" between a CQI parameter value obtained under the assumption (for the configuration) of a joint transmission JT CoMP scenario and one obtained under the assumption of a non-joint transmission, non-JT, CoMP scenario. This is referred to below as ΔCQI. Alternatively or additionally, such parameter may be a weighting factor (also referred to as power offset herein below) applied to CQI measurement/calculation values obtained for a respective CoMP scenario. This is referred to herein below also as beta. Such value beta is specific to each ComP scheme (CSI-RS configuration).

The factor "beta" (being representative of transmission power applied in the CoMP transmission scheme) is signaled and used for weighting the SINR measurement for a respective CoMP transmission scheme on the basis of which SINR value the CQI is derived/derivable. For example:

for a ComP scheme CoMP_1 we may compute the SINR as:

$$SINR1=beta1*S1/(S2+S3+N), \text{ while}$$

for a CoMP scheme ComP_2 we may compute the SINR as $$SINR2=beta2*(S1+S2+S3)/N.$$

The values beta may further be mapped to different CoMP schemes as follows, e.g.

Dynamic point selection DPS without blanking (point S1 selected, points S2, S3 not muted):

$$SINR1=beta1*S1/(S2+S3+N)$$

Joint transmission JT (points S1, S2, S3 jointly used to carry the useful/payload signal, no specific interference or noise expected from any of those S1, S2, S3):

$$SINR2=beta2*(S1+S2+S3)/N$$

Dynamic point selection DPS with blanking (point S1 selected, points S2, S3 muted)

$$SINR3=beta3*S1/N$$

Typically, beta is different from zero, but beta=0 is also possible, as that would correspond to making the UE never report that CoMP scheme for which beta=0 is assigned.

Beta>1 denotes an increase in the likelihood of the UE reporting the corresponding scheme as the best one. For example, if desired to give a 3 dB bonus to dynamic point selection DPS without blanking (as above) compared to joint transmission JT, setting of betas could be as follows: set beta1=2(~3 dB) and beta2=1. So, this would translate to 3 dB higher SINR1 than normal and hence make it more likely that UE reports CQI fro DPS without blanking (based on the corresponding SINR value) as the best scheme. Basically with beta<1 the same situation can be accomplished, but just other way around. Namely, setting beta1=1 and beta2=0.5, would again translate to 3 dB offset between the two schemes.

The biasing parameter beta denotes a power offset parameter for the useful signal, or the CQI offset for the whole computed CQI. So, the CoMP scheme specific power offset parameters are named e.g., beta1 and beta2, and by configuring these properly to the UE, the eNB can control the scaling between corresponding CQIs, and hence bias the UE in terms of CQI reporting, thus making the UE report one scheme as the best more likely than the other.

Being thus configured, in a step S5, the terminal device UE measures the channel corresponding to each non-zero power CSI-RS resource, i.e. each channel from a transmission point (assuming one transmission point corresponds to one CSI-RS-resource) of the CoMP set towards the UE.

In a subsequent step S6, the terminal UE measures the interference N from outside the CoMP measurement set, i.e. the interference N which is due to resources distinct from the informed configured CSI-RS resources measured.

In a subsequent step S7, for each CoMP scheme (informed in step S3), based on the measured channels (e.g. S1 to S3) and interference, e.g. N, a corresponding value such as a signal to interference noise ratio SINR and indicative of the CQI is calculated. Hence, for each CoMP scenario informed from the eNB to the UE to be measured/evaluated, a respective CQI value is obtained.

Then, in step S8, the UE applies the biasing parameters as configured to the computed CQI values (and/or to those values SINR indicative of the CQI).

Afterwards, the UE selects from the biased CQI values the value that is determined to b "best". This can be the biggest value (e.g. the one to which the biggest power offset parameter as a biasing parameter was applied), or the one considered to be big "enough" (e.g. the one which is at least bigger by the threshold value (as a biasing parameter) than another value).

In step S10, the thus selected "best" CQI value is reported from the terminal UE to the eNB together with the CoMP scheme ("name" or ID) for which that value was obtained.

In a step S11, at the eNB side, the system throughput can thus be optimized based on/using that reported value and CoMP scheme to which it pertains.

Thus, stated in other words, and as described above, according to at least aspects of the present invention it is thus, among others, proposed to allow the CQI computation and reporting based on a biasing parameter such as a threshold value for CQI type indication. The threshold (or biasing parameter) can be represented by an absolute difference "delta" between individual CQI values, or by a (at least one) scaling factor applied to at least one of CQI values.

At least two channel quality indicators $CQI_{JT}$ and $CQI_{non-JT}$ are computed at the UE side for at least two CoMP transmission scheme hypothesis, for example $CQI_{JT}$ for joint transmission and $CQI_{non-JT}$ for DPS or CS/CB. The joint transmission should result in considerably higher CQI compared to other CQI hypothesis to become beneficial also from system perspective.

An aspect of the invention pertains to signaling (from eNB to UE) of a value that the UE should use when comparing the first CQI (corresponding to the first scheme) with the second CQI (corresponding to the second scheme).

Such biasing parameter (biasing value) may be one of the following:

1) A delta value ($\Delta CQI$) that gives directly a threshold of how much better CQI the first scheme (e.g. JT-CoMP) should result into in order for the UE to report feedback for the first scheme, that is $CQI_{JT} > CQI_{non-JT} + \Delta CQI$.

Hence in this case the UE will indicate to the eNB that scheme corresponding to $CQI_{JT}$ should be used only when the $CQI_{JT}$ is better than $CQI_{non-JT}$ by the pre-defined offset. The $\Delta CQI$ may aid the fallback mode of the network in terms of scheme selection.

In this sense it gives the following advantages: The $\Delta CQI$ value can be used by eNB to scale the CQI if another CoMP scheme has to be selected.

With the CQI and the $\Delta CQI$ the eNB may evaluate importance of e.g. JT CoMP for that UE for that time instant. For example, if the JT-CQI reported is very low and scaling the CQI by the $\Delta CQI$ would result in zero TP (transmission point) the eNB would schedule the UE for JT-CoMP or if that is not possible then schedule another UE.

2) A power offset parameter as a biasing parameter that the UE should assume when calculating either $CQI_JT$ or $CQI_{non-JT}$. for example, when calculating $CQI_{JT}$, UE may assume reduced transmission power, hence decreasing also the $CQI_{JT}$ value. By controlling the PDSCH transmission power that the UE assumes for computation of $CQI_{JT}$ and $CQI_{non-JT}$, the eNB can control how much better one of the schemes should be such that UE would report it as the best scheme.

As an example, and for 1) above, we define:
$CQI_{JT}$ as the CQI that assumes joint transmission hypothesis.
$CQI_{non-JT}$ as the non-JT CQI representing the highest (biggest) CQI out of the non-JT hypothesis
$\Delta CQI$ a CQI threshold configured by the network.
For the UE to be able to report the JT-CoMP CQI the following condition needs to be fulfilled:

$$CQI_{JT} \geq \Delta CQI + CQI_{non-JT}$$

(Note that in this regard, the CQI for the JT CoMP scenario fulfils the condition with regard to each of the CQI values for non-JT CoMP scenarios if it satisfies the condition for the highest non-JT CQI value).

As a further example, and for 2) above, we define:
Dynamic point selection DPS without blanking
(point S1 selected, points S2, S3 not muted):

$$SINR1 = beta1*S1/(S2+S3+N)$$

Joint transmission JT
(points S1, S2, S3 jointly used to carry the useful/payload signal, no specific interference or noise expected from any of those S1, S2, S3):

$$SINR2 = beta2*(S1+S2+S3)/N$$

Dynamic point selection DPS with blanking
(point S1 selected, points S2, S3 muted)

$$SINR3 = beta3*S1/N$$

For the UE to be able to report the JT-CoMP CQI (represented by/based on the SINR) the following condition needs to be fulfilled:
SINR2=max {SINR1, SINR2, SINR3}, ("max" denoting a maximum function), or expressed otherwise:

$$SINR2 > SINR1$$

AND $$SINR2 > SINR3$$

When reporting the CoMP CQI, the UE also indicates the assumptions behind the CoMP CQI, i.e. the CoMP scheme on which the calculation of the CQI was based.

A UE procedure according to the invention is, at least in some aspects, as follows:

The UE receives from the eNB via higher layer signaling (RRC) multiple non-zero-power CSI-RS configurations. Additionally the UE may receive zero-power CSI-RS configurations e.g. for interference measurement purposes.

The UE receives the biasing parameters for CQI computations, e.g. the $\Delta CQI$ value or the power offset parameter(s) beta. There may be also multiple values signaled, one for each CoMP scheme.

The UE measures channel corresponding to the multiple non-zero-power CSI-RS resources, each typically mapped to one transmission point. UE measures interference outside of the CoMP measurement set. For each CoMP transmission hypothesis, the UE computes the CoMP CQI based on the measured channel and interference.

In case of scenario
1) $\Delta CQI$ values are used:
UE selects the best non JT transmission hypothesis UE makes the comparison $$CQI_{JT} \geq \Delta CQI + CQI_{non-JT}$$

2) power offsets parameter beta are used for each CoMP scheme, and the UE scales the power (i.e. SINR) by the corresponding signaled power offset parameter beta.

Under any of the above scenarios 1) and 2), the UE reports the best CoMP CQI to the eNB and an indication of the assumptions of the CQI (i.e. indication of the best CoMP scheme) for which the reported CQI value was obtained.

A corresponding eNB procedure is, at least in some aspects, as follows:

The eNB configures the UE with multiple non-zero-power CSI-RS configurations according to the determined CoMP measurement set. A CoMP measurement set may be determined for example based on received RSRP reports from the UE.

The eNB configures the UE with the ΔCQI values and/or the power offset parameters beta that the UE should take into account in CQI calculation. The eNB receives the CSI report from the UE, including CoMP CQI and the indication on the used CoMP scheme.

Other CoMP systems can benefit also from the principles presented herein as long as they rely on an identical or similar biasing parameters allocated to each CoMP scheme of transmission points designated for transmission towards another device, wherein the biasing parameter is indicative of a "preference" for one ComP scheme over others. (depending on the parameter, a "preference" may also be negative and lead to a "suppression", e.g. when setting beta to a value significantly smaller than 1, or even to a negative value)

Embodiments of the present invention may be implemented in software, hardware, application logic or a combination of software, hardware and application logic. The software, application logic and/or hardware generally resides on control modules or modems. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to CoMP enabled environments under WCDMA, LTE, WIMAX and or WLAN and can advantageously be implemented in user equipments or smart phones, or personal computers connectable to such networks as well as in network devices such as eNBs. That is, it can be implemented as/in chipsets to such devices, and/or modems thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

LIST OF EXEMPLARY ACRONYMS USED IN THIS DOCUMENT

CB coordinated beamforming
CoMP coordinated multipoint transmission
CS coordinated switching
CSI-RS channel state information reference signal
CQI channel quality indicator
DL downlink
DPS dynamic point selection
JT joint transmission
PDCCH physical downlink control channel
PMI precoding matrix information
RRC radio resource control
RSRP reference signal received power The present invention proposes methods and devices related to improvements in coordinated multipoint transmission arrangements, and in this regard proposes a device, comprising a controller module, configured to control a plurality of transmission points, each constituted by a set of at least one transmit antenna, to transmit data to another device in a coordinated transmission from at least a subset of the plurality of transmission points, wherein each subset with resources allocated thereto defines a respective coordinated transmission scheme, wherein the controller module is configured to transmit information on resources pertaining to multiple coordinated transmission schemes, and send at least one biasing parameter associated to at least one of the transmission schemes, to be applied for biasing a channel quality parameter. Another device comprises a controller module, configured to report feedback responsive to such coordinated transmission, and the controller module is, among others, configured to apply the at least one biasing parameter to derived channel quality parameters.

The invention claimed is:

1. A device, comprising:
   a controller module, configured to control a plurality of transmission points, each constituted by a set of at least one transmit antenna, to transmit data to another device in a coordinated multipoint transmission from at least a subset of the plurality of transmission points, wherein each subset with resources allocated thereto defines a respective coordinated multipoint transmission scheme,
   wherein the controller module is configured to
      transmit information on resources pertaining to multiple of the coordinated multipoint transmission schemes, and
      send to the another device at least one weighting parameter by which a channel quality parameter associated to at least one of the coordinated multipoint transmission schemes is to be weighted.

2. The device according to claim 1, wherein
   the controller module is further configured to determine which information on resources pertaining to multiple coordinated multipoint transmission schemes is to be transmitted.

3. The device according to claim 2, wherein
   the controller module is further configured to determine the information based on a report received from another device.

4. The device according to claim 1, wherein
   the controller module is further configured to receive a biased channel quality parameter from another device together with an indication for which of said multiple coordinated multipoint transmission schemes that biased channel quality parameter was obtained.

5. The device according to claim 1, wherein
   the controller module is further configured to send, as the at least one weighting parameter, a difference by which a channel quality parameter associated to one of the coordinated multipoint transmission schemes has to differ from other channel quality parameters associated to at least one other coordinated multipoint transmission scheme.

6. The device according to claim 1, wherein
the controller module is further configured to send a plurality of weighting parameters, each being associated to at least one coordinated multipoint transmission scheme.

7. A method, comprising:
controlling a plurality of transmission points, each constituted by a set of at least one transmit antenna, to transmit data to another device in a coordinated multipoint transmission from at least a subset of the plurality of transmission points, wherein each subset with resources allocated thereto defines a respective coordinated multipoint transmission scheme,
transmitting information on resources pertaining to multiple of the coordinated multipoint transmission schemes, and
sending to the another device at least one weighting parameter by which a channel quality parameter associated to at least one of the coordinated multipoint transmission schemes is to be weighted.

8. The method according to claim 7, further comprising:
determining which information on resources pertaining to multiple coordinated multipoint transmission schemes is to be transmitted.

9. The method according to claim 8, further comprising:
determining the information based on a report received from another device.

10. The method according to claim 7, further comprising:
receiving a biased channel quality parameter from another device together with an indication for which of said multiple coordinated multipoint transmission schemes that biased channel quality parameter was obtained.

11. The method according to claim 7, further comprising:
sending, as the at least one weighting parameter, a difference by which a channel quality parameter associated to one of the coordinated multipoint transmission schemes has to differ from other channel quality parameters associated to at least one other coordinated multipoint transmission scheme.

12. The method according to claim 7, further comprising:
sending a plurality of weighting parameters, each being associated to at least one coordinated multipoint transmission scheme.

13. A device, comprising
a controller module, configured to report feedback to another device responsive to the another device's coordinated multipoint transmission from at least a subset of a plurality of transmission points, each transmission point being constituted by a set of at least one transmit antenna, wherein each subset with resources allocated thereto defines a respective coordinated multipoint transmission scheme,
wherein the controller module is configured to
receive information on resources pertaining to multiple of the coordinated multipoint transmission schemes,
measure channels corresponding to each resource set defining a respective coordinated multipoint transmission scheme,
measure interference from outside each respective coordinated multipoint transmission scheme,
receive at least one biasing parameter associated to at least one of the coordinated multipoint transmission schemes, to be applied for biasing a channel quality parameter,
derive a channel quality parameter for each of the multiple coordinated multipoint transmission schemes based on the measured channels and the measured interference, and
apply the at least one biasing parameter to the derived channel quality parameters.

14. The device according to claim 13, wherein
the controller module is further configured to select one of the channel quality parameters to which a biasing parameter was applied as a biased channel quality parameter to be reported to another device.

15. The device according to claim 14, wherein
the controller module is further configured to transmit the selected biased channel quality parameter to another device together with an indication for which of said multiple coordinated multipoint transmission schemes that biased channel quality parameter was obtained.

16. The device according to claim 13, wherein
the controller module is further configured to receive, as the at least one biasing parameter, a difference by which a channel quality parameter associated to one of the coordinated multipoint transmission schemes has to differ from other channel quality parameters associated to at least one other coordinated multipoint transmission scheme.

17. The device according to claim 13, wherein
the controller module is further configured to receive, as the at least one biasing parameter, a weighting parameter by which a channel quality parameter associated to at least one of the coordinated multipoint transmission schemes is weighted.

18. The device according to claim 17, wherein
the controller module is further configured to receive a plurality of weighting parameters, each being associated to at least one coordinated multipoint transmission scheme.

19. A method, comprising:
reporting feedback to another device responsive to the another device's coordinated multipoint transmission from at least a subset of a plurality of transmission points, each transmission point being constituted by a set of at least one transmit antenna, wherein each subset with resources allocated thereto defines a respective coordinated multipoint transmission scheme,
receiving information on resources pertaining to multiple of the coordinated multipoint transmission schemes,
measuring channels corresponding to each resource set defining a respective coordinated multipoint transmission scheme,
measuring interference from outside of each respective coordinated multipoint transmission scheme,
receiving at least one biasing parameter associated to at least one of the coordinated multipoint transmission schemes, to be applied for biasing a channel quality parameter,
deriving a channel quality parameter for each of the multiple coordinated multipoint transmission schemes based on the measured channels and the measured interference, and
applying the at least one biasing parameter to the derived channel quality parameters.

20. The method according to claim 19, further comprising:
selecting one of the channel quality parameters to which a biasing parameter was applied as a biased channel quality parameter to be reported to another device.

21. The method according to claim 20, further comprising:
transmitting the selected biased channel quality parameter to another device together with an indication for which of said multiple coordinated multipoint transmission schemes that biased channel quality parameter was obtained.

22. The method according to claim 19, further comprising:
receiving, as the at least one biasing parameter, a difference by which a channel quality parameter associated to one of the coordinated multipoint transmission schemes has to differ from other channel quality parameters associated to at least one other coordinated multipoint transmission scheme.

23. The method according to claim 19, further comprising:
receiving, as the at least one biasing parameter, a weighting parameter by which a channel quality parameter associated to at least one of the coordinated multipoint transmission schemes is weighted.

24. The method according to claim 23, further comprising:
receiving a plurality of weighting parameters, each being associated to at least one coordinated multipoint transmission scheme.

25. A device comprising:
a controller module, configured to control a plurality of transmission points, each constituted by a set of at least one transmit antenna, to transmit data to another device in a coordinated multipoint transmission from at least a subset of the plurality of transmission points, wherein each subset with resources allocated thereto defines a respective coordinated multipoint transmission scheme, wherein
the controller module is configured to
  transmit information on resources pertaining to multiple of the coordinated multipoint transmission schemes, and
  send to the another device at least one biasing parameter associated to at least one of the coordinated multipoint transmission schemes, to be applied for biasing a channel quality parameter, wherein:
the device comprising the controller module is an eNB;
the another device is a user equipment; and
the eNB determines the subset of the plurality of transmission points for the coordinated multipoint transmission to transmit the data to the user equipment based at least in part on a channel quality indicator (CQI) parameter received at the eNB from the user equipment indicating quality of channels received by the user equipment; and
the biasing parameter is sent to the user equipment and indicates at least one of:
  ΔCQI which is a difference between the CQI parameter for a joint transmission coordinated multipoint transmission scheme and a non-joint transmission coordinated multipoint transmission scheme; and
  Beta which represents transmission power applied to the respective coordinated multipoint transmission scheme and is for weighting signal to interference plus noise (SINR) measurements by the UE for the respective coordinated multipoint transmission scheme on the basis of which SINR value a value for the CQI parameter is derived or derivable.

26. A device comprising:
a controller module, configured to report feedback to another device responsive to the another device's coordinated multipoint transmission from at least a subset of a plurality of transmission points, each transmission point being constituted by a set of at least one transmit antenna, wherein each subset with resources allocated thereto defines a respective coordinated multipoint transmission scheme, wherein
the controller module is configured to
  receive information on resources pertaining to multiple of the coordinated multipoint transmission schemes,
  receive at least one biasing parameter associated to at least one of the coordinated multipoint transmission schemes, to be applied for biasing a channel quality parameter,
  derive a channel quality parameter for each of the multiple coordinated multipoint transmission schemes, and
  apply the at least one biasing parameter to the derived channel quality parameters, wherein:
the device comprising the controller module is a user equipment;
the another device is an eNB; and
the biasing parameter is received from the eNB and indicates at least one of:
  ΔCQI which is a difference between the CQI parameter for a joint transmission coordinated multipoint transmission scheme and a non-joint transmission cooperative coordinated multipoint transmission scheme; and
  Beta which represents transmission power applied to the respective coordinated multipoint transmission scheme and is for weighting signal to interference plus noise (SINR) measurements by the UE for the respective coordinated multipoint transmission scheme on the basis of which SINR value a value for the CQI parameter is derived or derivable.

\* \* \* \* \*